United States Patent Office 3,410,927
Patented Nov. 12, 1968

3,410,927
POLYESTER FILAMENTS CONTAINING POLYETHYLENE GLYCOL ESTERS
Lawrence W. Crovatt, Jr., Raleigh, N.C., assignor to Monsanto Company, St. Louis, Mo., a corporation of Delaware
No Drawing. Filed June 20, 1966, Ser. No. 558,633
2 Claims. (Cl. 260—860)

ABSTRACT OF THE DISCLOSURE

Polyester fibers having improved resistance to static electricity build-up are prepared by dispersing in said polyester, prior to spinning, from 1 to 15 percent by weight of a fatty acid ester of poly(ethylene glycol) selected from the group consisting of poly(ethylene glycol) diacetate and poly(ethylene glycol) dibenzoate.

---

One of the major disadvantages of polyester filaments is that these materials are poor conductors of electricity, and therefore, sensitive to static electricity build-up. These static charges can occur quite readily on polyester filaments and necessary charge dissipation into the environmental atmosphere or to other objects is usually very slow. As a result, these filaments may remain electrostatically charged for hours at a time, especially under low humidity conditions which often occur during winter months. Because of this, poor antistatic property, manufacturing and processing difficulties are more readily encountered which lead to charged fibers and filaments clinging to guides and rolls in machinery and often times resulting in badly damaged or weakened filaments and fibers.

Present commercial polyester filaments and fibers are coated on the surface with a chemical finish material during manufacturing and processing to reduce the static build-up. However, these surface treatments are only of a temporary nature and are readily removed during further processing and extended use leaving the fibers with little or no static protection. Various end products, principally polyester continuous filaments used in men's shirts and various other articles of clothing, would have much greater appeal to the consumer if the fibers possessed reduced tendency to accumulate and retain electrostatic charges, especially after multiple washing and cleaning operations.

Soilage on polyester materials has not until recently been a problem due to the limited use of these materials. However, the soilage problem is becoming much more severe as polyester and polyester blend materials are used in end uses where heavy soiling is encountered. It is necessary to find ways of solving the soilage problem in polyester materials or their use in many areas will be severely limited.

Therefore, modified polyester compositions are needed which will render the end products, such as fibers or filaments with permanent antistatic and antisoiling protection. This protection will be meaningful, however, only if there is no significant sacrifice to other physical and chemical properties, and the article is able to withstand multiple laundering and cleaning operations without loss of these properties.

It is an object of this invention to provide polyester filaments and fibers which possess permanent antistatic properties.

It is another object of this invention to provide polyester filaments and fibers which possess antisoiling properties.

Other objects and advantages of this invention will become readily apparent from the detailed description thereof immediately following.

In general, the objects of this invention are accomplished by blending an ester-terminated high molecular weight polyalkylene oxide with fiber-forming polyester flake or finished polymer to provide modified polyester compositions containing the ester-terminated high molecular weight polyalkylene oxide in intimate mixture with the polyester. This modified polyester composition can then be melt spun into filament having excellent antistatic and antisoiling properties.

The ester-terminated high molecular weight polyalkylene oxides which may be employed for the purposes of this invention are compounds of the formula

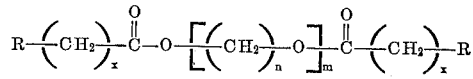

wherein R is selected from the group consisting of alkyl and aryl radicals, $n$ is an integer of from about 2 to 6, $m$ is an integer of at least 10 and $x$ is an integer of about 0 to 30. Preferably R is selected from the group consisting of methyl or phenyl radicals, $n$ is an integer of from 2 to 3, $m$ is an integer of 20 to 500, and $x$ is an integer of 0 to 16. These ester-terminated polyalkylene oxides should have a molecular weight of at least about 500 and preferably from about 1000 to 20,000. It is preferred to use the polyethylene glycol esters of acetic acid or benzoic acid having an average molecular weight of from about 9000 to 20,000. The modified polyester filaments should contain from about 1 to 15 percent by weight and preferably from about 2 to 10 percent by weight of the ester-terminated polyalkylene oxide. It is necessary that the ester-terminated polyalkylene oxides be blended with, and not reacted with, the polyester if good mechanical properties are to be maintained in the modified polyester filaments obtained.

Preparation of the ester-terminated polyalkylene oxides may be conveniently carried out by refluxing a hydroxyl-terminated polyalkylene oxide in toluene solvent with a 27 molar ratio amount of the desired chloride, such as acetyl or benzoyl chloride and 3 molar ratio amount of pyridine. The molar ratios given are based upon one mole of the polyalkylene oxide. The mixture is refluxed for 12 hours and then allowed to cool. The respective ester-terminated polyalkylene oxide was isolated from the solution by precipitation which was accomplished by addition of copious quantities of diethyl ether. The white, finely divided product was then filtered and washed several times with ether before vacuum drying overnight.

The synthetic linear condensation polyesters which may be modified in accordance with the practice of this invention are those formed from dicarboxylic acids and dicarboxylic acid esters and glycols, and copolyesters or modifications of these polyesters and copolyesters. In a highly polymerized condition, these polyesters and copolyesters can be formed into filaments and the like and subsequently oriented permanently by drawing. The polyesters and copolyesters specifically useful in the instant invention are those resulting from heating one or more of the glycols of the series, $HO(CH_2)_nOH$, in which $n$ is an integer from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenylacetic acid, succinic acid, p,p'-dicarboxybiphenyl, p,p' - dicarboxycarbanilide, p,p'-dicarboxytriocarbanilide, p,p' - dicarboxydiphenylsulfone, p - carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p' - dicarboxydiphenylethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl-4-(beta-carboxyethoxy) benzoic acid, oxalic acid, glutaric acid, pimelic acid, suberic acid, azelaic acid, and the dioxy acids of ethylene dioxide having the general formula,

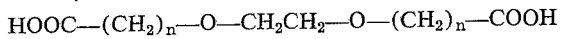

HOOC—$(CH_2)_n$—O—$CH_2CH_2$—O—$(CH_2)_n$—COOH wherein $n$ is an integer from 1 to 4, and the aliphatic, cycloaliphatic and aryl esters and half esters, ammonium and amine salts, and the acid halides of the above-named compounds and the like. Examples of the glycols which may be employed in practicing the instant invention are ethylene glycol, 1,5-pentanediol, 1,3-propanediol, 1,6-hexanediol, 1,7-heptanediol, 1,8-octanediol, 1,9-nonanediol, 1,10-decanediol and the like. Polyethylene terephthalate, however, is the preferred polyester because of the ready availability of terephthalic acid and ethylene glycol, from which it is made. It also has a relatively high melting point of about 250 through 265° C. and this property is particularly desirable in the manufacture of filaments in the textile industry.

Modified synthetic condensation polymers, which have been found to be amenable to the beneficial results attainable in the practice of this invention, are those fully described in U.S. Patent 2,895,946 to Huffman. In brief, they differ from conventional polyester polymers in that small amounts of modifying agents are employed in their production in addition to the standard polyester-forming reactants, i.e., a dibasic acid, such as terephthalic acid, isophthalic acid or the esters thereof, and a polymethylene glycol such as ethylene glycol.

Broadly speaking, the modifying agents employed to produce these modified polyesters are of the type which are known in the art as chain-terminators and cross-linking agents. The particular combination of chain-terminators and chain-branching agents or cross-linking compounds employed in the production of the polymers with which this invention is concerned have been found to be extremely effective in the enhancement of polymer receptivity for dyestuffs.

Specifically, the chain-terminating agents which are used in preparing the modified polymers suitable for use with the invention are monohydric polyalkylene oxides having the general formula

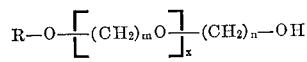

$$R-O-\left[(CH_2)_mO\right]_x-(CH_2)_n-OH$$

wherein R is an alkyl group containing 1 to 4 carbon atoms, $m$ and $n$ are integers from 1 to 4, and $x$ is an integer in the range of from 1 to 100 or greater. Examples of such substances are methoxypolyethylene glycol, ethoxypolyethylene glycol, propoxypolyethylene glycol, butoxypolyethylene glycol, methoxypolypropylene glycol, methoxypolymethylene glycol and the like. Methoxypolyethylene glycol is especially suitable.

Materials suitable as chain-branching agents or cross-linking agents, which are employed to increase the viscosity or molecular weight of the polyesters under consideration are the polyols which have a functionality greater than two and which are of the general formula

$$R(OH)_n$$

wherein R is a saturated aliphatic hydrocarbon radical containing from 3 to 6 carbon atoms. Suitable examples of such compounds are glycerol, sorbitol and pentaerythritol, with pentaerythritol being particularly preferred. Triacids, such as trimesic acid, and triesters, such as the trimethyl ester of trimesic acid, may also be used as chain-branching agents if desired.

In preparing the modified polyesters described above, the noted chain-terminating agents are employed in amounts ranging from about 0 to 4.0 mole percent, based on the amount of dicarboxylic acid or ester-forming derivative thereof employed in the polymer-forming reaction. The chain-branching or cross-linking agents are employed in amounts ranging from about 0 to 2.4 mole percent, based on the amount of dicarboxylic acid or ester-forming derivative thereof employed in the polymerization reaction.

It is believed that the polyester modification in accordance with the present invention involves essentially no reaction between the modifying agent and the polyester structure. The ester-terminated polyalkylene oxide modifying agents are believed to remain essentially intact and become fairly evenly dispersed in a separate phase throughout the polymer-filament substrate. If the ester-terminated polyalkylene oxide modifying agents are added during the preparation of the polyester composition, they will become an integral part of the polyester chain and cause a degradation in many of the desirable properties found in the polyester composition. Therefore, the ester-terminated polyalkylene oxide modifying agents should be blended with the polyester composition using standard mechanical or melt blending techniques prior to melt-spinning the modified compositions into filaments. It is necessary that the ester-terminated polyalkylene oxide modifying agents of this invention be stable under standard melt-spinning conditions used for the preparation of polyester filaments.

If it is desired to produce shaped articles from compositions of the present invention which have a modified appearance or modified properties, various agents may be added to the polyester composition before, during or after the addition of the ester-terminated polyalkylene oxide. Such added agents might be plasticizers, pigments, dyes, fire-retarding agents, stabilizers and the like.

To further illustrate the present invention and the advantages thereof, the following specific exampes are given, it being understood that these are merely intended to be illustrative and not limitative. Unless otherwise indicated, all parts and percents are by weight.

In order to demonstrate the practical usefulness of the modified polyester yarns of this invention, comparative tests were made in the examples involving measurement of the time required for one-half of the static charge build-up generated on the respective fabrics to decay. These measurements were conducted on a dynamic static tester described in detail in American Dyestuff Reporter, volume 40, pages 164–168 (1951). The method of measurement involves attaching the test fabrics onto an aluminum cylinder which is rotated at approximately 300 r.p.m. The fabrics are then electrostatically charged by allowing them to rub against a second fabric surface. After two minutes of rubbing, contact between the two fabrics surfaces is broken and while the fabric on the cylinder continues to rotate, the time required for one-half the static charge to decay or dissipate is measured. The better antistatic fabrics require less time for static decay.

Prior to conducting the static test, all of the knit fabrics were given 20 standard laundering operations followed by two hot water rinses. The fabrics were then air dried for one hour followed by conditioning at 35% relative humidity and 70° F. which are the conditions under which the tests were conducted. A standard laundering operation involves agitating the fabric for 20 minutes in a scour solution composed of 0.1 percent by weight of an ethoxylated nonylphenol nonionic surfactant and 0.1 percent by weight of tetra sodium pyrophosphate at a 40:1 liquor to fiber weight ratio.

The soiling test procedure given in the examples involves tumbling for a period of one hour each polyester fabric with 10 percent by weight of vacuum sweeping dust. Each fabric was then vacuumed to remove loose dust particles and was measured for brightness level on a G.E. Color Spectrophotometer. The Y coordinate on the spectrophotometer gives a measure of brightness of each sample.

The disperse dyeability test procedure used in the examples involves dyeing drawn yarns with 5 percent, based on the fiber weight, of Celliton Fast Blue AF Extra Concentrated dyestuff (Disperse Blue 9, C.I. 61115) at 212° F. for a period of two hours. Dyebath to fiber weight ratio of 40:1 was maintained. The amount of dyestuff absorbed by the fiber was determined by measuring optical densities of the exhausted dyebath.

Example 1

This example illustrates the preparation of filaments from a conventional polyethylene terephthalate composition prepared in a standard manner and will be used as a standard comparison with the modified polyester filaments of this invention having improved properties.

Polyethylene terephthalate flake, after vacuum drying for 24 hours at 70° C., was melted at about 275 to 280° C. while under a vacuum of 0.5 to 1.0 mm. mercury in a stainless steel autoclave. The melted polymer was then melt-spun directly from the unit through a 14-hole spinneret to yield white multifilament yarn. This yarn was then drawn at a draw ratio of 5.38X resulting in a drawn yarn having a calculated tenacity of 4.64 grams per denier. The yarn was then converted to knit fabric and found to have the following properties: a half-life static charge decay of 180 minutes and 15 seconds, a brightness level after soiling of 30.44 units and a dye absorption of 0.32%.

Example 2

Polyethylene terephthalate flake, processed as described in Example 1, was blended with rapid stirring in a stainless steel autoclave with 5.0 percent by weight of the polyethylene glycol ester of acetic acid having an average molecular weight of about 9000. The polymer blend was then spun directly from the unit through a 14-hole spinneret to yield white multifilament yarn. This yarn was drawn at a draw ratio of 5.0 yielding drawn yarn having a calculated tenacity of 4.78 grams per denier. The yarn was then converted to knit fabric having the following properties: a half-life static charge decay of 2 minutes and 57 seconds, a brightness level after soiling of 42.07 units and a dye absorption of 0.72%.

Example 3

Polyethylene terephthalate flake, processed as described in Example 1, was blended with rapid stirring in a stainless steel autoclave with 10.0 percent by weight of the polyethylene glycol ester of acetic acid having an average molecular weight of about 9000. The polymer blend was then melt-spun directly from the unit through a 14-hole spinneret to yield white multifilament yarn. The yarn was drawn at a draw ratio of 5.05X yielding drawn yarn having a calculated tenacity of 4.84 grams per denier. This yarn was then converted to knit fabric having the following properties: a half-life static charge decay of 14 minutes and 4 seconds and a brightness level after soiling of 48.54 units.

Example 4

Polyethylene terephthalate flake, processed as described in Example 1, was blended with rapid stirring in a stainless steel autoclave with 5.0 percent by weight of the polyethylene glycol ester of acetic acid having an average molecular weight of about 20,000. The polymer blend was then melt-spun directly from the unit through a 14-hole spinneret to yield white multifilament yarn. The yarn was then drawn at a draw ratio of 4.33X yielding drawn yarn having a calculated tenacity of 3.66 grams per denier. This yarn was converted to knit fabric having the following properties: a half-life static charge decay of 1 minute and 1 second, a brightness level after soiling of 48.86 units, and a dye absorption of 1.29%.

Example 5

Polyethylene terephthalate flake, processed as described in Example 1, was blended with rapid stirring in a stainless steel autoclave with 10.0 percent by weight of the polyethylene glycol ester of acetic acid having an average molecular weight of about 20,000. The polymer blend was then melt-spun directly from the unit through a 14-hole spinneret to yield white multifilament yarn. The yarn was drawn at a draw ratio of 4.55X and the drawn yarn was then converted to knit fabric having the following properties: a half-life static charge decay of 17 minutes and 10 seconds and a brightness level after soiling of 41.81 units.

Example 6

Polyethylene terephthalate flake, process as described in Example 1, was blended with rapid stirring in a stainless steel autoclave with 5.0 percent by weight of the polyethylene glycol ester of benzoic acid having an average molecular weight of about 9000. The polymer blend was then melt-spun directly from the unit through a 14-hole spinneret to yield white multifilament yarn. The yarn was drawn at a draw ratio of 5.34X yielding a drawn yarn having a calculated tenacity of 5.36 grams per denier. This yarn was then converted to knit fabric having the following properties: a half-life static charge decay of 2 minutes and 45 seconds and a brightness level after soiling of 44.51 units.

Example 7

Polyethylene terephthalate flake, processed as described in Example 1, was blended with rapid stirring in a stainless steel autoclave with 10.0 percent by weight of the polyethylene glycol ester of benzoic acid having an average molecular weight of about 9000. The polymer blend was then melt-spun directly from the unit through a 14-hole spinneret to yield white multifilament yarn. The yarn was then drawn at a draw ratio of 5.58X yielding a drawn yarn having a calculated tenacity of 4.51 grams per denier. This yarn was converted to knit fabric having the following properites: a half-life static charge decay of 42 seconds and a brightness level after soiling of 48.39 units.

Example 8

Polyethylene terephthalate flake, processed as described in Example 1, was blended with rapid stirring in a stainless steel autoclave with 5.0 percent by weight of the polyethylene glycol ester of benzoic acid having an average molecular weight of about 20,000. The polymer blend was then melt-spun directly from the unit through a 14-hole spinneret to yield white multifilament yarn. This yarn was drawn at a draw ratio of 4.89X yielding drawn yarn having a calculated tenacity of 3.31 grams per denier. This yarn was converted to knit fabric having the following properties: a half-life static charge decay of 7 minutes and 40 seconds and a brightness level after soiling of 43.26 units.

Example 9

Polyethylene terephthalate flake, processed as described in Example 1, was blended with rapid stirring in a stainless steel autoclave with 10.0 percent by weight of the polyethylene glycol ester of benzoic acid having an average molecular weight of about 20,000. The polymer blend was then melt-spun directly from the unit through a 14-hole spinneret to yield white multifilament yarn. The yarn was drawn at a draw ratio of 4.76X yielding a drawn yarn having a calculated tenacity of 3.45 grams per denier. This yarn converted to knit fabric having the following properties: a half-life static charged decay of 2 minutes and 28 seconds and a brightness level after soiling of 37.79 units.

Example 10

This example demonstrates the deficiencies found in using a polyethylene glycol having terminal hydroxyl groups and not being ester-terminated.

Polyethylene terephthalate flake, processed as described in Example 1, was blended with rapid stirring in a stainless steel autoclave with 5.0 percent by weight of a polyethylene glycol having a molecular weight of about 9000 and having hydroxyl ends. The polymer blend was then melt-spun directly from the unit through a 14-hole spinneret to yield white multifilament yarn. The yarn was drawn at a draw ratio of 5.11X yielding drawn yarn having a calculated tenacity of 4.31 grams per denier. This yarn was converted to knit fabric having the following property: a half-life static charge decay of 43 minutes and 48 seconds.

Polyethylene terephthalate flake, processed as described in Example 1, was blended with rapid stirring in a stainless steel autoclave with 5.0 percent by weight of a polyethylene glycol having an average molecular weight of about 20,000 and having hydroxyl ends. The polymer blend was melt-spun directly from the unit through a 14-hole spinneret to yield white multifilament yarn. The yarn was drawn at a draw ratio of 4.25X yielding drawn yarn having a calculated tenacity of 4.83 grams per denier. The yarn was then converted to knit fabric having the following property: a half-life static charge decay of 34 minutes and 35 seconds.

It is to be understood that changes and variations may be made in the present invention without departing from the spirit and scope thereof as defined in the appended claims.

What is claimed is:

1. A composition of matter comprising a synthetic, highly polymeric polyester blended with from about 1 to 15 percent by weight, based on the weight of the composition, of poly(ethylene glycol) dibenzoate having an average molecular weight from about 9,000 to 20,000.

2. A composition as defined in claim 1 wherein the polyester contains 2 to 10 percent by weight of polyethylene glycol dibenzoate.

References Cited

UNITED STATES PATENTS

| | | | |
|---|---|---|---|
| 2,393,863 | 1/1946 | Myers | 260—31.4 |
| 3,177,174 | 4/1965 | Tirpak | 260—31.4 |
| 3,329,557 | 6/1967 | Magat et al. | 161—172 |
| 3,355,413 | 10/1967 | Kiefer | 260—31.4 |

FOREIGN PATENTS

| | | |
|---|---|---|
| 849,039 | 9/1960 | Great Britain. |
| 956,833 | 4/1964 | Great Britain. |

MURRAY TILLMAN, *Primary Examiner.*

J. T. GOOLKASIAN, *Assistant Examiner.*